UNITED STATES PATENT OFFICE.

HANS J. VON METZRADT, OF NEW YORK, N. Y.

GALVANIC-BATTERY FLUID.

SPECIFICATION forming part of Letters Patent No. 383,677, dated May 29, 1888.

Application filed September 27, 1887. Serial No. 250,857. (No specimens.)

*To all whom it may concern:*

Be it known that I, HANS J. VON METZRADT, a citizen of the United States, and a resident of the city of New York, in the county and State of New York, have invented certain new and useful Improvements in Electric-Battery Fluids, of which the following is a full, clear, and exact specification.

My invention relates to solutions used as exciting-fluids for galvanic batteries, and the purpose of my improvement is to produce a liquid the use of which will tend to diminish polarization and effect a stronger and more constant voltaic action than has heretofore been attained.

My improved composition consists of the following ingredients, combined in the proportions stated, namely: sulphuric acid, four hundred cubic centimeters; water, two hundred cubic centimeters; nitric acid, two hundred cubic centimeters; bichromate of potash, one hundred grams.

In making the combination it is indispensable that the proportions in the above formula should be accurately made.

The process of compounding the elements is as follows: I first mix the sulphuric acid and water by pouring the acid into the water, and then allow this mixture to cool off thoroughly. I take nitric acid, which is found in the market generally at sixty-nine and seventy per cent. and reduce it to forty per cent. by the proportional addition of water, and then allow this to cool off thoroughly before uniting it with the sulphuric acid. To the mixture already prepared, as stated, I add lastly the bichromate of potash. This fluid is used in the inner cell, or with the porous cup of the battery.

The outside cell or part containing the zinc is charged with a fluid consisting of the following elements, combined in the proportions named: sea salt, five hundred cubic centimeters; water, fifteen hundred cubic centimeters. In making this solution I dissolve the salt in boiling water to obtain a more thorough solution.

After a long series of tests I have found that the fluid, proportioned and combined as above stated, produces a greater degree of constancy of the battery, acts with more intensity by diminishing polarization and in batteries where the two fluids are used as exciting-liquids produce an incandescent light of milky whiteness and brilliant constancy.

What I claim as new, and desire to secure by Letters Patent, is—

A solution for galvanic batteries, composed of four hundred cubic centimeters of sulphuric acid, two hundred of water, two hundred of nitric acid reduced to forty per cent., and one hundred grams of bichromate of potash, as set forth.

HANS J. VON METZRADT.

Witnesses:
HERMAN G. LOEW,
K. NEWELL.